United States Patent
Fineman et al.

(10) Patent No.: US 10,997,319 B2
(45) Date of Patent: *May 4, 2021

(54) SYSTEMS AND METHODS FOR ANONYMIZED BEHAVIOR ANALYSIS

(71) Applicant: Visa International Service Association, San Francisco, CA (US)

(72) Inventors: Daniel E. Fineman, San Francisco, CA (US); Carlo Cubeddu, Berlin (DE); Lace Cheung, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/667,012

(22) Filed: Oct. 29, 2019

(65) Prior Publication Data

US 2020/0082122 A1    Mar. 12, 2020

Related U.S. Application Data

(63) Continuation of application No. 15/435,071, filed on Feb. 16, 2017, now Pat. No. 10,496,847.

(51) Int. Cl.
*G06F 21/62* (2013.01)
*H04L 29/06* (2006.01)
(Continued)

(52) U.S. Cl.
CPC ..... *G06F 21/6254* (2013.01); *G06Q 30/0201* (2013.01); *H04L 63/0421* (2013.01); *H04L 67/22* (2013.01)

(58) Field of Classification Search
CPC . G06F 21/6254; H04L 67/22; H04L 63/0421; G06Q 30/0201
See application file for complete search history.

(56) References Cited

U.S. PATENT DOCUMENTS 8,874,465 B2   10/2014   Heiser et al.
8,918,329 B2   12/2014   Shahan et al.
(Continued)

OTHER PUBLICATIONS

U.S. Appl. No. 15/435,071, "Non-Final Office Action", dated Jan. 25, 2019, 13 pages.
(Continued)

*Primary Examiner* — J. Brant Murphy
(74) *Attorney, Agent, or Firm* — Kilpatrick Townsend & Stockton LLP

(57) ABSTRACT

Systems and methods for anonymized behavior analysis are described. A requesting computer having access to personally identifiable information (PII) for a group of users may provide the PII to an intermediary computer having access to associated real identifiers. The intermediary computer may provide the associated real identifiers to a behavior analysis computer, which may calculate a behavior metric for each of the real identifiers, and calculate an aggregated behavior metric for the entire subset of real identifiers. The behavior analysis computer may send the aggregated behavior metric back to the requesting computer; thus, no individual behavior metrics are disclosed to the requesting computer. This process can be done without sharing the PII with the behavior analysis computer, or the real identifiers with the requesting computer, thereby protecting the privacy of the users.

20 Claims, 7 Drawing Sheets

(51) Int. Cl.
   *G06Q 30/02* (2012.01)
   *H04L 29/08* (2006.01)

(56) References Cited

U.S. PATENT DOCUMENTS

| | | | | |
|---|---|---|---|---|
| 9,032,531 | B1* | 5/2015 | Scorvo | H04L 63/1408 726/25 |
| 2005/0203857 | A1* | 9/2005 | Friedman | G07F 7/0833 705/78 |
| 2005/0222906 | A1* | 10/2005 | Chen | G06Q 30/02 705/14.41 |
| 2006/0059148 | A1* | 3/2006 | Dunki | G06F 11/3672 |
| 2007/0143853 | A1* | 6/2007 | Tsukamoto | G06K 19/07309 726/26 |
| 2009/0133836 | A1* | 5/2009 | Kimball | H01J 37/32935 156/345.28 |
| 2010/0094758 | A1* | 4/2010 | Chamberlain | G06Q 10/06375 705/50 |
| 2010/0192220 | A1* | 7/2010 | Heizmann | G06F 21/6254 726/19 |
| 2011/0231225 | A1* | 9/2011 | Winters | G06Q 30/0201 705/7.29 |
| 2012/0203856 | A1* | 8/2012 | Wu | H04L 61/2596 709/206 |
| 2012/0221421 | A1* | 8/2012 | Hammad | G06Q 10/00 705/16 |
| 2012/0284127 | A1* | 11/2012 | Heiser, II | G06Q 30/0255 705/14.66 |
| 2012/0303616 | A1* | 11/2012 | Abuelsaad | G06F 21/6254 707/736 |
| 2012/0310732 | A1* | 12/2012 | Heiser, II | G06Q 30/0215 705/14.45 |
| 2013/0246215 | A1* | 9/2013 | Faith | G06Q 50/01 705/26.7 |
| 2014/0012916 | A1* | 1/2014 | van Ham | H04L 65/403 709/204 |
| 2014/0047551 | A1* | 2/2014 | Nagasundaram | G06F 21/606 726/26 |
| 2014/0201007 | A1* | 7/2014 | Stack | G06Q 10/10 705/14.66 |
| 2014/0337089 | A1* | 11/2014 | Tavares | G06Q 20/30 705/7.29 |
| 2014/0337998 | A1* | 11/2014 | Johansson | G06F 16/00 726/27 |
| 2015/0026181 | A1* | 1/2015 | Milton | G06F 16/29 707/737 |
| 2015/0134528 | A1* | 5/2015 | Fineman | G06Q 30/0207 705/44 |
| 2015/0169895 | A1* | 6/2015 | Gkoulalas-Divanis | G06F 21/6254 726/26 |
| 2015/0269346 | A1* | 9/2015 | Lee | G06Q 30/0255 705/14.53 |
| 2015/0302464 | A1* | 10/2015 | Iannace | G06Q 30/0201 705/7.29 |
| 2016/0344702 | A1* | 11/2016 | Ukena | H04L 63/0421 |
| 2017/0024484 | A1* | 1/2017 | Qiu | G06F 16/211 |
| 2017/0039327 | A1* | 2/2017 | Bitran | G16H 70/20 |
| 2017/0308717 | A1* | 10/2017 | Huang | G16B 50/30 |
| 2018/0096365 | A1* | 4/2018 | Noyes | G06Q 30/0206 |

OTHER PUBLICATIONS

U.S. Appl. No. 15/435,071, "Notice of Allowance", dated Jul. 29, 2019, 15 pages.

* cited by examiner

SYSTEMS AND METHODS FOR ANONYMIZED BEHAVIOR ANALYSIS

The present application is a continuation of U.S. patent application Ser. No. 15/435,071 filed on Feb. 16, 2017, the entire disclosure of which is incorporated herein by reference in its entirety for all purposes.

BACKGROUND

Over the past several years, greater amounts of money have been spent by companies on marketing strategies and advertising. Advertising may typically be presented to consumers through various mediums, such as radio, television, print, and/or the Internet. To make this advertising most effective, companies may attempt to target their advertising efforts on consumers who are most likely to be interested in the advertised product or service. By only targeting the most interested consumers, greater sales and revenues may be appreciated by the companies, while decreasing advertising costs.

Various methods may be implemented by companies to identify the most interested consumers. In order to effectively target these consumers, information about them must be known or collected. As one example, with respect to the Internet, behavioral data may be collected about the consumers through monitoring of the websites that they visit and the content presented on those websites. For example, a user that visits many travel-related websites may be better targeted with an advertisement for a travel package to Australia than a user that visits many home improvement websites. However, this type of targeting may not be the most effective, because only a small percentage of users that regularly visit travel-related websites may actually consider or be able to afford the travel package to Australia.

In another example, with respect to television, demographics data may be collected about viewers and related to the content or timing of the programs they view in order to target advertisements. For example, statistics may be collected showing that 75% of viewers of a home improvement show are men. Thus, a commercial for men's clothing may be better suited for broadcast during the home improvement show than another show with only 35% male viewership. However, this type of targeting may also not be the most effective, because it does not consider the propensity of the male viewers of the home improvement show to purchase new clothing.

Given these drawbacks, advertisement targeting may be improved by considering accumulated information related to a consumer's spending habits. Thus, some retailers have implemented loyalty programs to track the spending behavior of their customers. However, these loyalty programs are only capable of tracking purchases made at their respective retailers. Although cross-retailer loyalty programs exist, they are only capable of tracking purchases made at participating retailers. Thus, a participating retailer would have no knowledge of a customer's purchase history at non-participating retailers. Nevertheless, many customers would be hesitant to share their identities and full spending histories with a retailer for privacy reasons.

SUMMARY

Thus, there is a need for systems and methods for anonymized behavior analysis that comprehensively track behaviors of individuals without disclosing their private information. Embodiments of the invention can address these and other problems, individually and collectively.

For example, in the spending realm, embodiments of the invention may provide spending behavior data for a cohort of viewers targeted by a requesting company (e.g., an advertiser, a retailer, an agency, etc.). The requesting company may provide personally identifiable information (PII) for a group of individuals (e.g., consumers, customers, viewers, etc.) to a credit bureau that has access to primary account numbers (PANs) associated with a payment processing network (e.g., Visa™) The credit bureau may match the PII to the PANs, replace the PII with anonymized identifiers, and send the match list to the payment processing network. The credit bureau may also provide a match list back to the requesting company with the PII, corresponding anonymized identifiers, and a match flag. In some embodiments, the match list provided to the requesting company may be "salted", i.e., contain false positive match flags, so that the requesting company does not definitively know whether or not a particular viewer has a PAN associated with the payment processing network (e.g., to protect privacy).

The requesting company may extract the matches from the match list and divide the viewers into cohorts based on any criteria (e.g., demographics such as gender, income level, etc.). The matches may be assigned a cohort identifier based on their division. The cohort identifier and associated anonymized identifiers may be sent to the payment processing network. The payment processing network may map the anonymized identifiers associated with the cohort identifier back to the PANs, then calculate a spending behavior metric associated with each PAN at the account level. The payment processing network may then aggregate the account-level spending behavior metrics into an aggregated spending behavior metric for the cohort. The payment processing network may then send the aggregated spending behavior metric for the cohort back to the requesting company along with the cohort identifier. Thus, spending data for the cohort may be aggregated and provided to the requesting company without revealing any individual spending behaviors for any particular individuals.

In some embodiments of the invention, a method is provided. The method comprises receiving, by a server computer, a plurality of anonymized identifiers. Each of the plurality of anonymized identifiers is associated with a real identifier of a plurality of real identifiers stored by the server computer. The plurality of anonymized identifiers includes a plurality of matched identifiers. Each matched identifier of the plurality of matched identifiers was generated by an intermediary computer in response to a match between personally identifiable information (PII) received from a requesting computer and a real identifier of the plurality of real identifiers stored by the server computer. The method further comprises storing, by the server computer, the plurality of anonymized identifiers in association with the plurality of real identifiers. The method further comprises receiving, by the server computer from the requesting computer, a cohort identifier associated with a subset of the plurality of anonymized identifiers. The cohort identifier characterizes the subset of the plurality of anonymized identifiers based on one or more criteria. The method further comprises retrieving, by the server computer, a subset of the plurality of real identifiers associated with the subset of the plurality of anonymized identifiers. The method further comprises calculating, by the server computer, at least one metric for the subset of the plurality of real identifiers. The method further comprises aggregating, by the server computer, the at least one metric for the subset of the plurality of real identifiers to determine at least one aggregated metric for the subset of the plurality of anonymized identifiers. The method further comprises transmitting, by the server computer, the cohort identifier and the at least one aggregated metric to the requesting computer.

In some embodiments, a server computer is provided. The server computer comprises a processor and a memory coupled to the processor. The memory stores instructions, which when executed by the processor, cause the server computer to perform operations including the steps of the above method.

These and other embodiments of the invention are described in further detail below.

DETAILED DESCRIPTION

Figure 1:
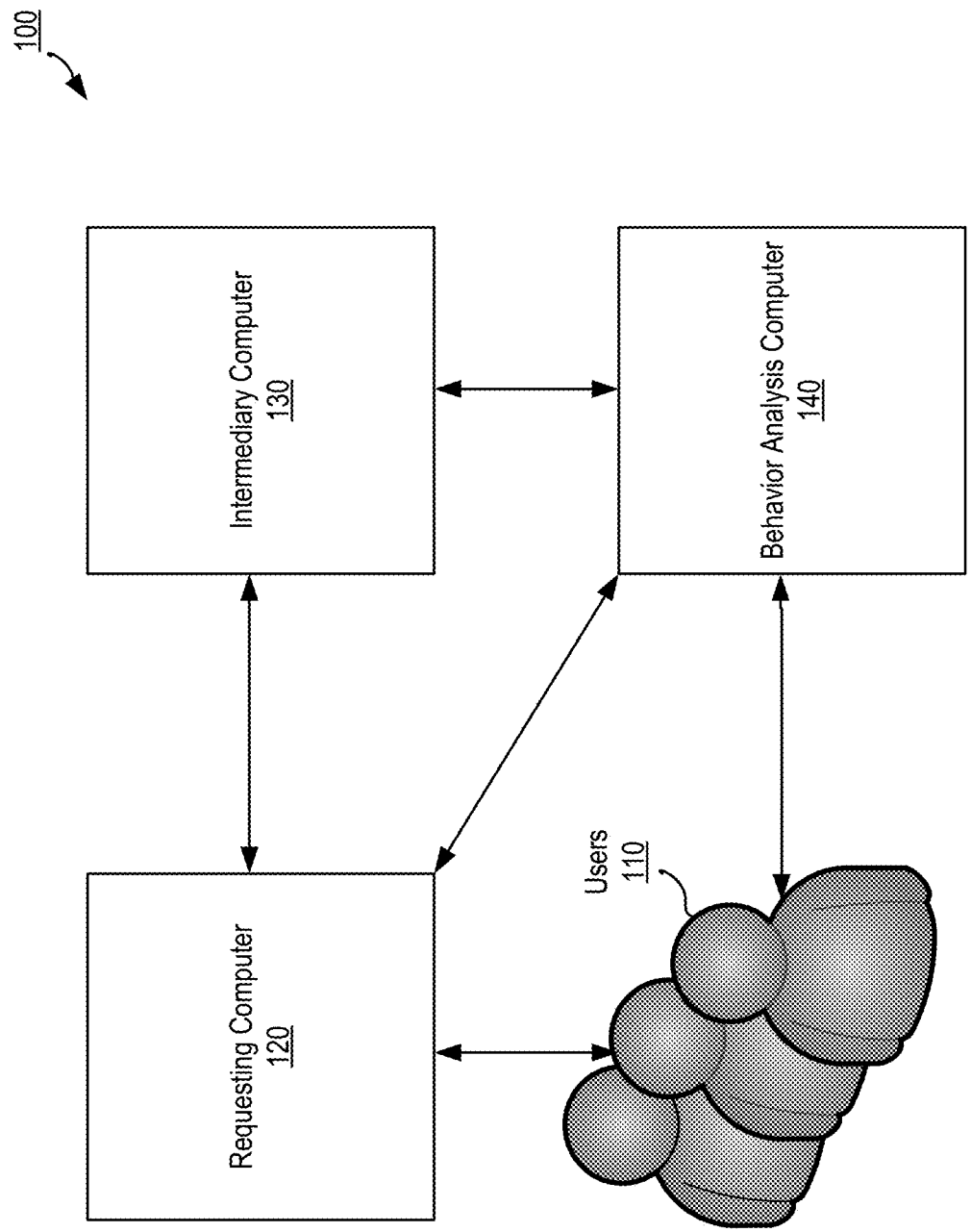
FIG. 1 shows a block diagram of a system for anonymized behavior analysis, according to an embodiment of the present invention.

Embodiments of the invention are directed to systems and methods for anonymized behavior analysis. A requesting company may provide personally identifiable information (PII) for a group of individuals to an intermediary computer that has access to real identifiers. The intermediary computer may match the PII to the real identifiers, replace the PII with anonymized identifiers, and send the match list to a behavior analysis computer. The behavior analysis computer may also receive a cohort identifier corresponding to a subset of the anonymized identifiers. The subset of the anonymized identifiers may correspond to individuals that have at least one criteria in common, such as income level, location, gender, age, or the like. The behavior analysis computer may map the anonymized identifiers to the associated real identifiers, calculate a behavior metric for each of the real identifiers, and calculate an aggregated behavior metric for all of the real identifiers. The behavior analysis computer may then send the aggregated behavior metric and the cohort identifier back to the requesting computer.

Advantageously, embodiments of the invention allow a requesting company to receive and analyze aggregated behavior of a cohort of individuals that share at least one common criteria of interest. This behavior may be observed and aggregated by the behavior analysis computer, which may have proper and allowed access to the individual behavior metrics. However, no individual behaviors for any particular individuals are identified by the behavior analysis computer. In addition, anonymized identifiers may be used across entities, such that no entity is able to access personal information to which it does not already have access. For example, the requesting company is not provided with the real identifiers, and the behavior analysis computer is not provided with the PII. Thus, privacy of the individuals is protected.

Prior to discussing specific embodiments of the invention, some terms may be described in detail.

A "cohort" may refer to a group of individuals sharing at least one common trait, characteristic, behavior, membership, interest, and/or experience. In some embodiments, a cohort may include a single individual selected from a group if that individual is the only individual in the group with one or more particular traits, characteristics, behaviors, memberships, interests, and/or experiences. Exemplary cohorts may include males between 35-39, people living in a particular zip code, doctors, college students who have studied abroad, recent visitors to a zoo, viewers of a particular advertisement, loyalty program members, and the like.

"Criteria" may refer to one or more specifications, definitions, requirements and/or details of something. In some embodiments, criteria may refer to one or more characteristics common to a group, e.g., defining characteristics of a group of items or individuals. Exemplary criteria may include demographic or statistical information, such as age, gender, location, income level, education, nationality, ethnicity, religion, and the like.

An "identifier" may refer to any combination of letters, numbers, and/or symbols used to uniquely identify something. An identifier may be assigned randomly, consecutively, or according to any pattern or algorithm. A "real identifier" may refer to an identifier that includes real or actual information that has not been encrypted, changed, modified, or anonymized. Exemplary real identifiers include names, e-mail addresses, account numbers, social security numbers, phone numbers, Internet Protocol (IP) addresses, and the like. An "anonymized identifier" may be an identifier that is associated with a real identifier, but that does not include at least a part of the real or actual information. An anonymized identifier may be generated or selected randomly, in a particular order (e.g., sequentially or according to a pattern), or may be generated or selected by applying an algorithm to the associated real identifier. In some embodiments, an anonymized identifier may be an encrypted version of a real identifier and/or a modified version of a real identifier (e.g., a masked version).

A "metric" may refer to any standard for measuring or evaluating something, such as behavior. In some embodiments, a metric may include a statistic or other numerical measurement or calculation, such as a number, a frequency, a percentage, mean, a variance, a quantity, a median, and the like. In some embodiments, a metric may correspond to a category. For example, a metric for entertainment may include a percentage of movies seen in a particular genre, a frequency of visits to a movie theater in a given year, an average price paid for DVDs, a number of sitcoms watched per night, and the like. An "aggregated metric" may refer to multiple metrics that are combined in some way. An aggregated metric may be combined across multiple individuals. For example, an aggregated metric may correspond to an average and/or combined number of miles traveled by multiple individuals. An aggregated metric may additionally or alternatively correspond to metrics combined across multiple categories. For example, an aggregated metric may correspond to a total amount of money spent on travel and dining by one individual over a time period. An aggregated metric may additionally or alternatively correspond to metrics combined across multiple individuals and multiple categories.

"Personally identifiable information" (PII) may refer to any information that can be used on its own or with other information to identify a person. The phrase "personally identifiable information" as used herein may be referred to interchangeably as "personal information", "personal identifiable information", "personally identifying information", "personal identifying information", and the like. Examples of personally identifying information include name, social security number, date of birth, place of birth, mother's maiden name, biometric information, medical information, educational information, financial information, employment information, combinations thereof, and the like. In some embodiments, personally identifiable information includes or is sensitive information.

A "resource" may be any tangible or intangible asset. Exemplary resources include money, labor, data, software, goods, information, services, and the like.

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. A behavior analysis computer, a requesting computer, and/or an intermediary computer may be examples of server computers.

I. Systems for Anonymized Behavior Analysis

According to some embodiments of the invention, behavior analysis may involve multiple entities having access to different information and acting in varying capacities. FIG. 1 illustrates a block diagram of a system 100 for anonymized behavior analysis according to some embodiments of the present invention. System 100 includes users 110, a requesting computer 120, an intermediary computer 130, and a behavior analysis computer 140. Each of the users 110, the requesting computer 120, the intermediary computer 130, and the behavior analysis computer 140 may be in operative communication with each other, such as over one or more networks. The one or more networks may be any type of wired or wireless networks.

The requesting computer 120 may interface with the users 110. Although illustrated as three users 110, it is contemplated that any number of users (i.e., one or more) may be included in users 110. In some embodiments, the users 110 may interact with the requesting computer 120 to request a resource, such as goods or services. Thus, in some embodiments, the requesting computer 120 may be associated with a resource provider, as discussed further herein. For example, the users 110 may be subscribers or viewers, and the requesting computer 120 may be associated with a cable television provider, a particular television channel, a particular television program, and/or the like. In another example, the users 110 may be listeners, and the requesting computer 120 may be associated with a satellite or Internet radio provider, a particular radio station, a particular radio program, and/or the like. In still another example, the users 110 may be consumers, and the requesting computer 120 may be associated with a particular merchant or retailer, a group of merchants, a location of a merchant, and/or the like. In still another example, the users 110 may be visitors, and the requesting computer 120 may be associated with a website. In some embodiments, the requesting computer 120 may be associated with an entity other than a resource provider. For example, the requesting computer 120 may be associated with an advertising agency, a marketing agency, and/or any other agency representing the interests of one or more similar or different resource providers.

The requesting computer 120 may wish to learn more about the behaviors of the users 110. For example, the requesting computer 120 may exercise control over the types of advertisements provided to the users 110, and thus may desire to know which advertisements would be most well received by the users 110. However, it is contemplated that the requesting computer 120 may want to learn about the behaviors of the users 110 for any of a number of other reasons as well, such as to formulate or recommend future development and marketing strategies.

Through its relationship with the users 110, the requesting computer 120 may have access to personally identifiable information (PII) associated with the users 110. For example, a television provider may maintain a list of users 110 that subscribe to its service, or a merchant may maintain a list of consumers who have made purchases there. In the case of a requesting computer 120 which is not directly associated with a resource provider, the resource provider may provide the PIIs of the users 110 to the requesting computer 120. The requesting computer 120 may not have access to other sensitive information (e.g., real identifiers) associated with the users 110. For example, the requesting computer 120 may not have access to primary account numbers (PANs) associated with the users 110. Although the users 110 may have previously provided their PANs to the requesting computer 120, the requesting computer 120 may not retain this information for privacy and/or security reasons.

Through its relationship with the users 110, the requesting computer 120 may also have access to characteristics or criteria of the users 110. Such criteria may include demographic information. For example, the requesting computer 120 may know the genders, income levels, locations, nationalities, ethnicities, combinations thereof, and the like, of the users 110.

The requesting computer 120 may interact with an intermediary computer 130. The intermediary computer 130 may have access to comprehensive information about the users 110, including PIIs and real identifiers, amongst other information. For example, in the financial realm, the intermediary computer 130 may be associated with a credit bureau. In such an example, the credit bureau may have access to PII stored in association with financial information for the users 110, including names, addresses, social security numbers, real identifiers (e.g., account numbers, including PANs), debts, combinations thereof, and/or the like. In other examples, the intermediary computer 130 may be associated with an authorizing entity, an issuer, and/or any other entity with access to PIIs and real identifiers.

The requesting computer 120 may send the PIIs for the users 110 to the intermediary computer 130. The intermediary computer 130 may match the PIIs to their associated real identifiers. In some embodiments, only real identifiers associated with one or more particular entities are matched to the PIIs. For example, the intermediary computer 130 may only indicate a match if the PII is associated with an account number for a particular processing network (e.g., a payment processing network such as Visa™), a particular authorizing entity (e.g., a bank such as an issuer), and/or a particular behavior analysis computer 140, described further herein.

For those PIIs that are matched to real identifiers stored by the intermediary computer 130, the intermediary computer 130 may generate anonymized identifiers for each of the matched PIIs. The intermediary computer 130 may replace the matched real identifiers with the anonymized identifiers. The intermediary computer 130 may provide a list of anonymized identifiers and corresponding PIIs back to the requesting computer 120. In some embodiments, the list may be "salted", i.e., include anonymized identifiers for PIIs that do not have a matching real identifier.

In some embodiments, the intermediary computer 130 may generate anonymized identifiers for each of the PIIs, regardless of whether they are matched or unmatched to real identifiers. The intermediary computer 130 may replace the matched real identifiers with the corresponding anonymized identifiers, or add corresponding anonymized identifiers to unmatched real identifiers as appropriate. The intermediary computer 130 may also generate a positive or negative match flag for each PII-anonymized identifier pair indicating whether or not a corresponding real identifier was located. The intermediary computer 130 may provide a list of anonymized identifiers, corresponding PIIs, and corresponding match flags back to the requesting computer 120. In some embodiments, the list may be "salted", i.e., include positive match flags associated with PIIs that do not have a matching real identifier.

Thus, because the real identifiers may be removed from the list before it is sent to the requesting computer 120, the requesting computer 120 does not gain access to the real identifiers of the users 110. Further, because the list may be "salted", the requesting computer 120 may not definitively know whether certain users 110 have associated real identifiers of interest at all. These features of embodiments of the invention protect the privacy and security of users 110.

The intermediary computer 130 may further replace the PIIs with the anonymized identifiers, and provide a list of the anonymized identifiers and their matched real identifiers to the behavior analysis computer 140. The behavior analysis computer 140 may already have access to the real identifiers of the users 110 through an existing relationship between the behavior analysis computer 140 and the users 110. For example, the users 110 may hold an account with the behavior analysis computer 140 for which the behavior analysis computer 140 stores corresponding real identifiers for the users 110. However, the behavior analysis computer 140 may not have access to certain or all PIIs of the users 110. Thus, because the PIIs may be removed from the list before it is sent to the behavior analysis computer 140, the behavior analysis computer 140 does not gain access to the PIIs of the users 110. This feature of embodiments of the invention protect the privacy and security of users 110.

The requesting computer 120 may extract the matches from the list received from the intermediary computer 130 if appropriate (e.g., by removing entries on the list that include negative match flags). The requesting computer 120 may divide the remaining entries into cohorts and assign cohort identifiers to the cohorts. In some embodiments, the requesting computer 120 may access characteristics of the users 110 associated with the remaining entries to select certain users 110 sharing one or more commonalities. The commonalities may include demographics (e.g., income level, location, gender, age, etc.), advertising exposure (e.g., individuals that viewed a particular advertisement), loyalty program enrollment, behaviors (e.g., individuals who watch a certain television program, individuals who visited Times Square in the last 6 months, etc.), combinations thereof, and/or the like. The cohorts may be selected based on the attributes or behaviors that the requesting computer 120 wishes to analyze. For example, the requesting computer 120 may select the users 110 associated with the remaining entries that are female and between the ages of 21-25. Although described with respect to a single cohort in that example, in some embodiments, the requesting computer 120 may divide the users 110 associated with the remaining entries into multiple cohorts that may or may not share overlapping users 110, e.g., a first cohort of females between the ages of 21-25, and a second cohort of people that watch a certain television show. In some embodiments, the cohort identifier may be assigned by the intermediary computer 130.

The requesting computer 120 may send the cohort identifiers and the anonymized identifiers associated with each cohort identifier to the behavior analysis computer 140. The behavior analysis computer 140 may map the anonymized identifiers associated with each cohort identifier back to their associated real identifiers. The behavior analysis computer 140 may calculate a metric associated with each real identifier for each cohort. The behavior analysis computer 140 may calculate the metric using the real identifier and data available to the behavior analysis computer 140, such as through its relationship with the users 110. The behavior analysis computer 140 may aggregate the metrics for the real identifiers in a given cohort, thereby anonymizing the data in the sense that it is no longer associated with a single user of users 110. The behavior analysis computer 140 may send the aggregated metric for each cohort back to the requesting computer 120 along with the cohort identifier. Thus, behavior data for the cohort is aggregated and provided to the requesting computer 120 without revealing any individual behaviors for any particular users 110, protecting the privacy and security of the users 110.

Figure 2:
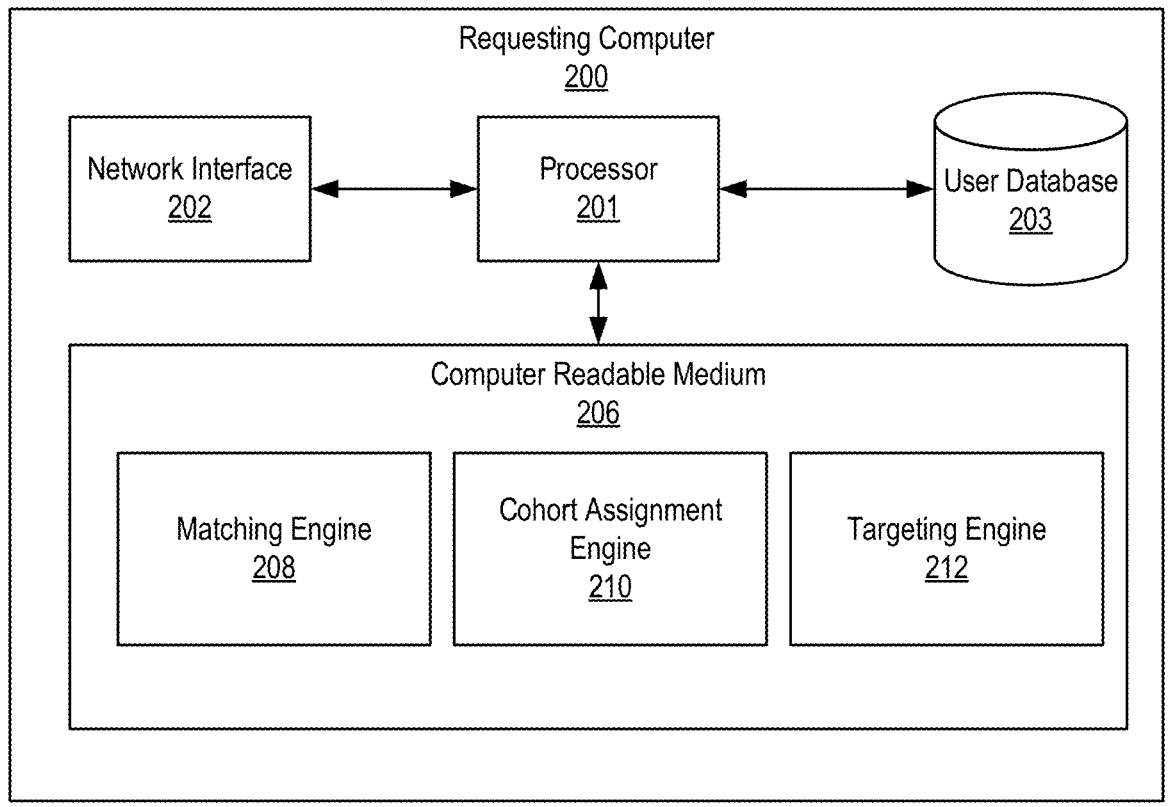
FIG. 2 shows a block diagram of a requesting computer, according to an embodiment of the present invention.

FIG. 2 shows a block diagram of a requesting computer 200 according to some embodiments of the present invention. Requesting computer 200 may be implemented as requesting computer 120 of FIG. 1, for example. In some embodiments, requesting computer 200 may be associated with a resource provider. However, as discussed above with respect to FIG. 1, requesting computer 200 may not be directly associated with a resource provider in some embodiments, and may instead represent an agency or other organization representing the interests of or acting on behalf of one or more resource providers.

Requesting computer 200 may include a processor 201 coupled to a network interface 202 and a computer readable medium 206. Requesting computer 200 may also include or otherwise have access to a user database 203 that may be internal or external to the requesting computer 200. The user database 203 may be configured to store user information and PIIs in association with anonymized identifiers for users. The user database 203 may further include criteria or characteristics associated with the users, such as, for example, demographic or behavioral information.

Processor 201 may include one or more microprocessors to execute program components for performing the functions of the requesting computer 200. Network interface 202 can be configured to connect to one or more communication networks to allow requesting computer 200 to communicate with other entities such as users, intermediary computers, behavior analysis computers, etc. Computer readable medium 206 may store code executable by the processor 201 for implementing some or all of the functions of requesting computer 200. For example, computer readable medium 206 may include code implementing a matching engine 208, a cohort assignment engine 210, and a targeting engine 212. Although shown and described as having three engines 208, 210, 212, it is contemplated that the computer readable medium 206 may include any number of additional or fewer engines performing any or all of the functions described herein or additional functions.

The matching engine 208 may work in conjunction with the processor 201 to match user information to PII stored in the user database 203. For example, users may register with, subscribe to, or otherwise access the requesting computer 200. Upon access, users may be required to establish user information, such as a user name or other identifier, with the requesting computer 200. Users may further directly (e.g., from the user to the requesting computer 200) or indirectly (e.g., by the user giving the requesting computer 200 access to a third party) provide the requesting computer 200 with PII. This PII may be associated with the user information by the matching engine 208 and stored in association in the user database 203. The matching engine 208 may further be configured to, in conjunction the processor 201, match the stored PII to anonymized identifiers received corresponding to the PII, and to store the anonymized identifiers in conjunction with the PII in the user database 203.

The cohort assignment engine 210 may work in conjunction with the processor 201 to assign anonymized identifiers that have matched real identifiers, as indicated by an intermediary computer, to one or more cohorts. The cohort assignment engine 210 may retrieve the anonymized identifiers corresponding to users meeting certain criteria from the user database 203 and assign them to a cohort. The cohort may be associated with a cohort identifier that can be uniquely used by the requesting computer 200 to identify the criteria used to select those users. Once at least one cohort of anonymized identifiers has been identified, the cohort identifier and corresponding anonymized identifiers may be sent by the cohort assignment engine 210 to a behavior analysis computer via the network interface 202.

The targeting engine 212 may work in conjunction with the processor 201 to receive one or more aggregated metrics for a cohort from the behavior analysis computer. The targeting engine 212 may analyze the aggregated metrics and draw conclusions about the cohort based on the criteria common to the cohort and the aggregated metrics for the cohort. For example, the targeting engine 212 may learn that 95% of a cohort consisting of 18-50 year olds watched television on Tuesday between 6 and 8 PM, and conclude that a large majority of adults watch television after work. The targeting engine 212 may, in some embodiments, take one or more actions based on the analysis and conclusions. For example, the targeting engine 212 may facilitate selection of a television advertisement geared toward adults to be shown on a weekday between 6 and 8 PM. In another example, the targeting engine 212 may analyze whether an advertisement previously shown on a weekday between 6 and 8 PM resulted in greater sales to adults.

Figure 3:
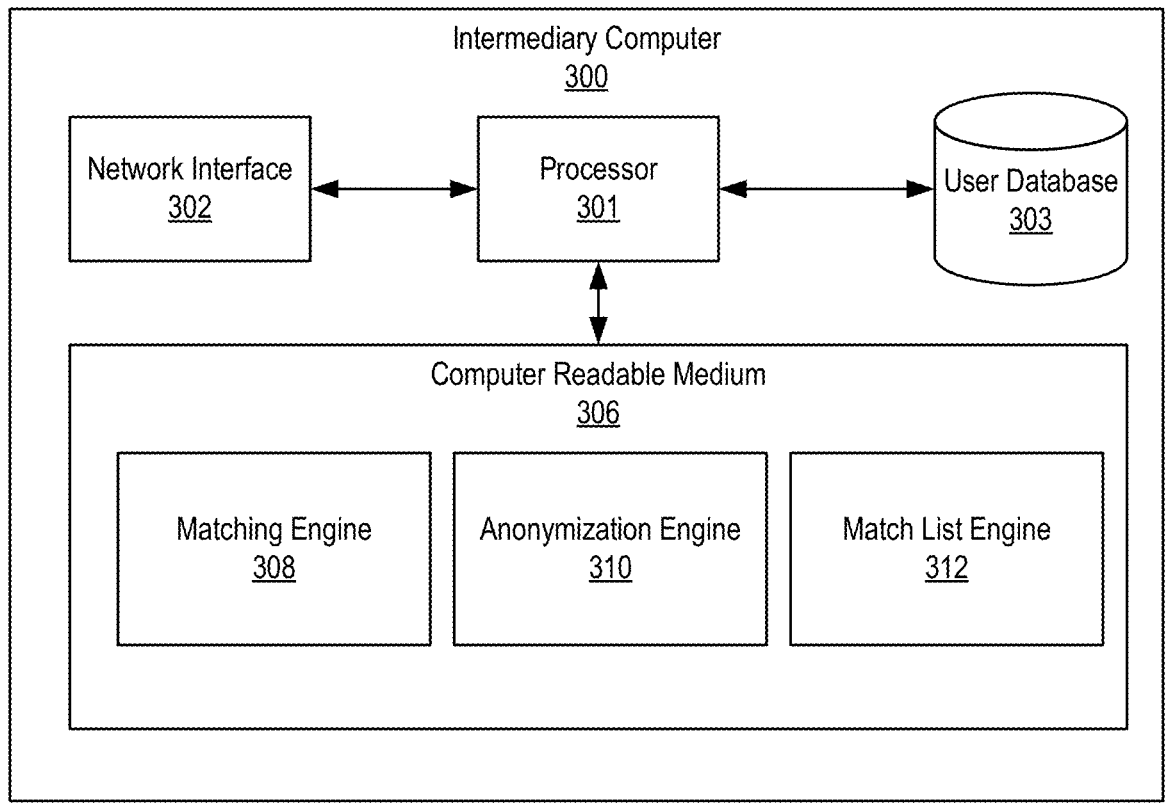
FIG. 3 shows a block diagram of an intermediary computer, according to an embodiment of the present invention.

FIG. 3 shows a block diagram of an intermediary computer 300 according to some embodiments of the present invention. Intermediary computer 300 may be implemented as intermediary computer 130 of FIG. 1, for example. In some embodiments, intermediary computer 300 may have access to comprehensive information about users, including PII and real identifiers. For example, in the financial realm, the intermediary computer 130 may be associated with a credit bureau.

Intermediary computer 300 may include a processor 301 coupled to a network interface 302 and a computer readable medium 306. Intermediary computer 300 may also include or otherwise have access to a user database 303 that may be internal or external to the intermediary computer 300. The user database 303 may be configured to store PIIs in association with real identifiers and anonymized identifiers for users.

Processor 301 may include one or more microprocessors to execute program components for performing the functions of the intermediary computer 300. Network interface 302 can be configured to connect to one or more communication networks to allow intermediary computer 300 to communicate with other entities such as requesting computers, behavior analysis computers, etc. Computer readable medium 306 may store code executable by the processor 301 for implementing some or all of the functions of intermediary computer 300. For example, computer readable medium 306 may include code implementing a matching engine 308, an anonymization engine 310, and a match list engine 312. Although shown and described as having three engines 308, 310, 312, it is contemplated that the computer readable medium 306 may include any number of additional or fewer engines performing any or all of the functions described herein or additional functions.

The matching engine 308 may work in conjunction with the processor 301 to receive PIIs from a requesting computer. The matching engine 308 may search the user database 303 with the PIIs for their associated real identifiers. The matching engine 308 may further determine whether the real identifiers meet any specified criteria such as, for example, whether the real identifier is associated with a particular processing network, a particular authorizing entity, a particular behavior analysis computer, and/or the like. In some embodiments, the matching engine 308 may generate a match flag for each PII indicating whether or not that PII has an associated real identifier meeting the criteria. In some embodiments, some of the match flags may be false positive match flags, i.e., positive match flags associated with PIIs that do not, in fact, have a matching real identifier or for which the matching real identifier does not meet the specified criteria.

The anonymization engine 310 may work in conjunction with the processor 301 to select or generate anonymized identifiers for each PII-real identifier pair identified by the matching engine 308. The anonymized identifiers may not include at least a part of the underlying PII and/or the real identifier so as to protect the information, which may be considered sensitive by the associated user. The anonymized identifiers may be selected or generated randomly, in a particular order (e.g., sequentially), or by applying an algorithm to the underlying PII and/or the real identifier. In some embodiments, the anonymization engine 310 may generate anonymized identifiers for only those PII-real identifier pairs meeting any specified real identifier criteria. In some embodiments, the anonymization engine 310 may generate anonymized identifiers for all of the PII-real identifier pairs.

The match list engine 312 may work in conjunction with the processor 301 to generate match lists to be sent to the requesting computer and the behavior analysis computer. The match list engine 312 may receive the PIIs and the associated real identifiers of the users, as well as the match flags, from the matching engine 308. The match list engine 312 may also receive the associated anonymized identifiers from the anonymization engine 310, and combine the PIIs, the real identifiers, the anonymized identifiers, and the match flags into one table. For the requesting computer, the match list engine 312 may remove the real identifiers from the table, leaving only the PIIs, the anonymized identifiers, and the match flags. The match list engine 312 may then facilitate transmission of the table to the requesting computer via the network interface 302. For the behavior analysis computer, the match list engine 312 may remove the PIIs from the table and the entries corresponding to negative match flags, leaving only the real identifiers and the anonymized identifiers associated with positive match flags. Thus, no sensitive information is unnecessarily disclosed to the requesting computer or the behavior analysis computer.

Figure 4:
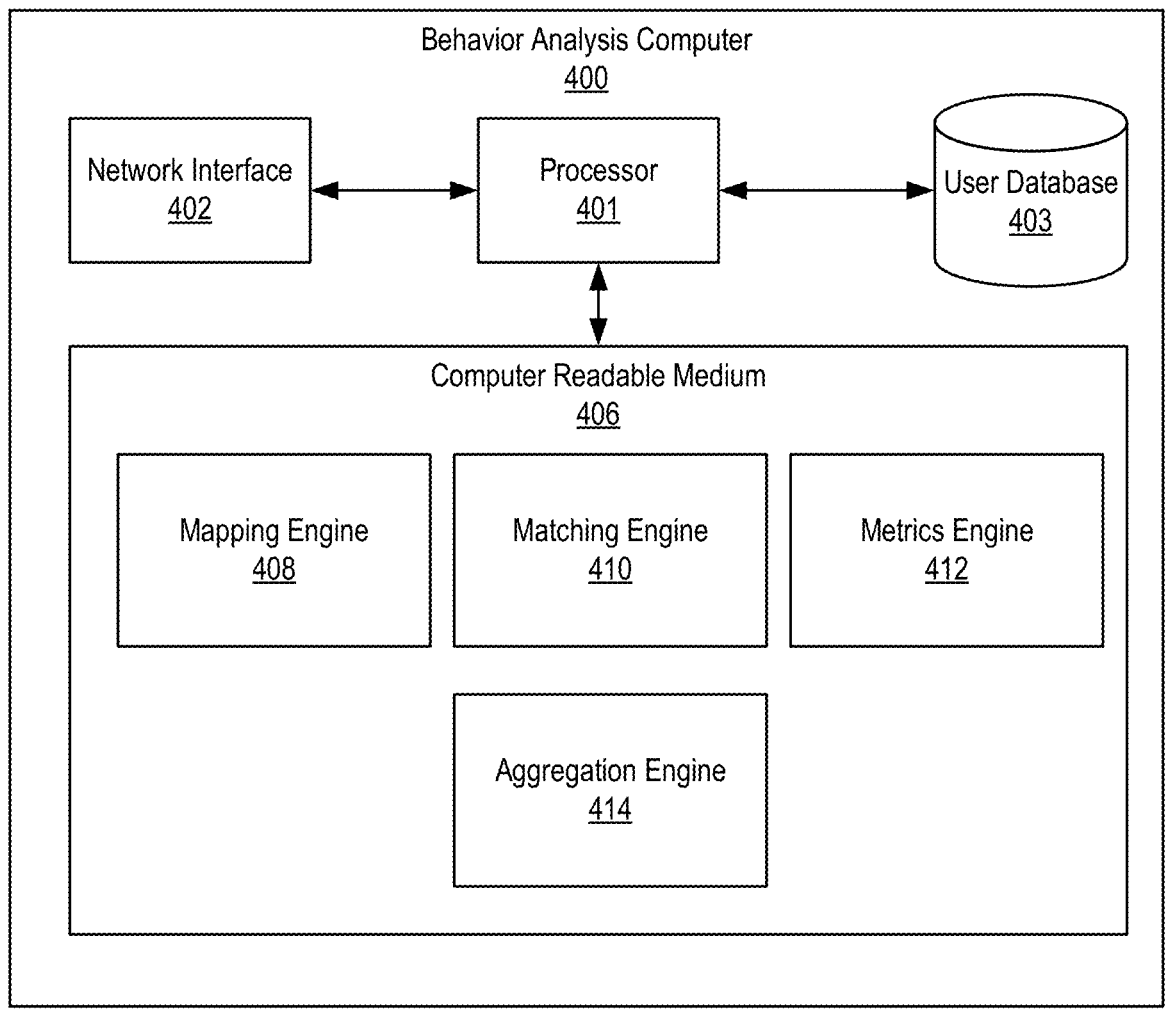
FIG. 4 shows a block diagram of a behavior analysis computer, according to an embodiment of the present invention.

FIG. 4 shows a block diagram of a behavior analysis computer 400 according to some embodiments of the present invention. Behavior analysis computer 400 may be implemented as behavior analysis computer 140 of FIG. 1, for example. In some embodiments, behavior analysis computer 400 may have access to the real identifiers of users through an existing relationship, as well as behavioral data of the users that is stored in association with the real identifiers. For example, in the financial realm, the behavior analysis computer 400 may be a payment processing network or an issuer bank.

Behavior analysis computer 400 may include a processor 401 coupled to a network interface 402 and a computer readable medium 406. Behavior analysis computer 400 may also include or otherwise have access to a user database 403 that may be internal or external to the behavior analysis computer 400. The user database 403 may be configured to store real identifiers, anonymized identifiers and behavioral data for users.

Processor 401 may include one or more microprocessors to execute program components for performing the functions of the behavioral analysis computer 400. Network interface 402 can be configured to connect to one or more communication networks to allow behavioral analysis computer 400 to communicate with other entities such as requesting computers, users, intermediary computers, etc. Computer readable medium 406 may store code executable by the processor 401 for implementing some or all of the functions of behavioral analysis computer 400. For example, computer readable medium 406 may include code implementing a mapping engine 408, a matching engine 410, a metrics engine 412, and an aggregation engine 414. Although shown and described as having three engines 408, 410, 412, 414, it is contemplated that the computer readable medium 406 may include any number of additional or fewer engines performing any or all of the functions described herein or additional functions.

The mapping engine 408 may work in conjunction with the processor 401 to receive anonymized identifiers and corresponding real identifiers from an intermediary computer. The mapping engine 408 may further receive a subset of the anonymized identifiers and a cohort identifier from a requesting computer. The matching engine 408 may search the user database 403 with the subset of the anonymized identifiers to identify a corresponding subset of the real identifiers. The subset of the real identifiers may be provided to the matching engine 410.

The matching engine 410 may work in conjunction with the processor 401 to retrieve behavioral data for each real identifier of the subset of the real identifiers from the user database 403. The behavioral data may include any data about any user behavior, including spending behavior, viewing behavior, communication behavior, combinations thereof, and the like, as described further herein. The behavioral data retrieved may be specific to each real identifier.

The metrics engine 412 may work in conjunction with the processor 401 to calculate one or more metrics for each identifier of the subset of the real identifiers. For example, if the real identifier is an account number, one or more metrics may be calculated for each account number at an account level. In some embodiments, the metrics may be, for example, a statistic or other numerical measurement or calculation. The metrics may be indexed in some examples. For example, metrics may include an indexed buy rate (i.e., a buy rate of a user as an index of the national buying rate), an indexed spend (i.e., an average spend of a user as an index of the national average spend), indexed visits (i.e., an average number of visits as an index of the national average number of visits), combinations thereof, and the like. The metrics may be evaluated over a defined period of time in some embodiments.

The aggregation engine 414 may work in conjunction with the processor 401 to aggregate the account-level metrics for the subset of the real identifiers to determine an aggregated metric for the subset of the real identifiers (and thus, the subset of the anonymized identifiers). In other words, by aggregating the account-level metrics, an aggregated metric may be determined corresponding to the behavior of the cohort identified by the cohort identifier. Exemplary aggregated metrics may include a cohort indexed buy rate (i.e., a buy rate of the cohort as an index of the national buying rate), a cohort indexed spend (i.e., an average spend of the cohort as an index of the national average spend), combinations thereof, and the like. The aggregation engine 414 may be configured to transmit the cohort identifier and the aggregated metric to the requesting computer via network interface 402. Because the aggregated metric does not disclose any individual user's behavior, user privacy is protected.

II. Methods for Anonymized Behavior Analysis

Figure 5:
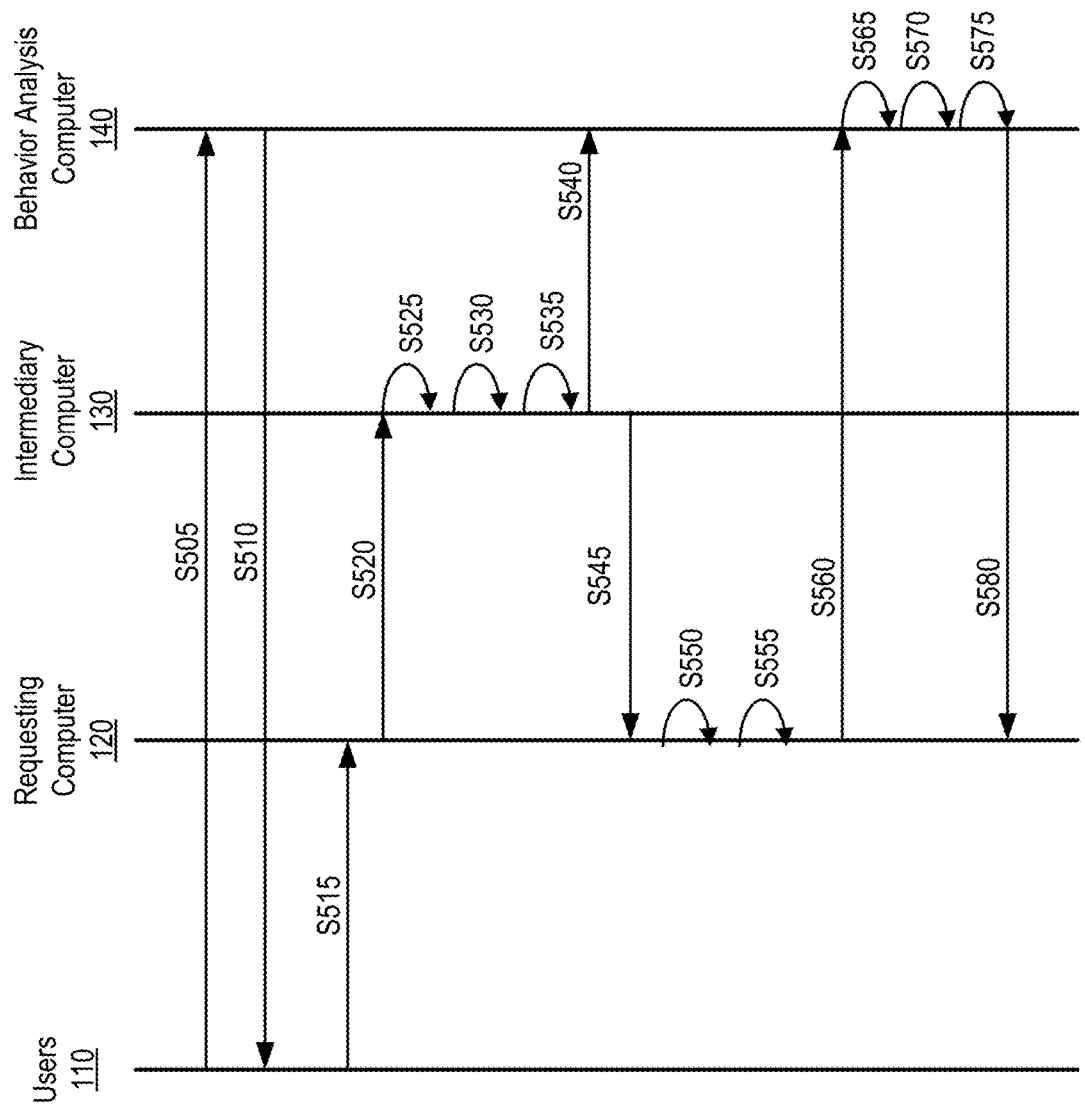
FIG. 5 shows a flow diagram of a method for anonymized behavior analysis, according to an embodiment of the present invention.

Various methods may be used by the above systems to implement embodiments of the invention. FIG. 5 is a flow diagram illustrating a method for anonymized behavior analysis according to some embodiments of the present invention. FIG. 5 may be implemented by users 110, requesting computer 120, intermediary computer 130, and behavior analysis computer 140.

At steps S505 and S510, users 110 may interact with the behavior analysis computer 140. In one example, the behavior analysis computer 140 may be a payment processing network that can process payment transactions. In the course of this interaction, users 110 may share or establish real identifiers with the behavior analysis computer 140, such as account numbers representing accounts held or processed by the behavior analysis computer 140. For example, the real identifiers may be primary account numbers (PANs) established by the users 110 with a payment processing network. Users 110 may use these real identifiers in such a manner that allows the behavior analysis computer 140 to observe their behavior. For example, users 110 may use a primary account number to perform transactions facilitated by the behavior analysis computer 140, such as when behavior analysis computer 140 is associated with the payment processing network.

At step S515, users 110 may interact with the requesting computer 120. In one example, the requesting computer 120 may be a content provider, such as a cable company. The interaction with the requesting computer 120 may be direct or indirect. For example, the requesting computer 120 may be a resource provider from which the users 110 request resources. For example, the requesting computer 120 may be a cable company from which the users 110 request cable television access. In another example, the requesting computer 120 may be an agency having a relationship with a resource provider from which users 110 request resources. For example, the requesting computer 120 may be an advertising agency representing a cable company from which the users 110 request cable television access.

At step S520, the requesting computer 120 may generate a request for behavioral data associated with the users 110. For example, the requesting computer 120 may desire to learn how to best target users 110 with advertising and/or resources. For example, a cable company may desire to learn about the spending behavior of users 110 in order to target users 110 with advertisements that are most likely to be effective. Thus, the requesting computer 120 may send the request, including PIIs for users 110 available to the requesting computer 120, to an intermediary computer 130. The PIIs may include any personally identifiable information, including, for example, a name and/or a social security number. In some embodiments, the intermediary computer 130 may be a middleman between the requesting computer 120 and the behavior analysis computer 140. The intermediary computer 130 may have access to further information about the users 110 that is needed by the requesting computer 120, such as real identifiers associated with the users 110. For example, the intermediary computer 130 may be a credit bureau having access to both PIIs and PANs.

At step S525, the intermediary computer 130 matches the PIIs in the request to real identifiers stored by the intermediary computer 130. At step S530, the intermediary computer 130 generates or selects an anonymized identifier for each matched PII-real identifier pair. The anonymized identifier may be generated to protect the PII and/or the real identifier of each user. The anonymized identifier may be any suitable character or set of characters that do not disclose the underlying PII or real identifier, e.g., "A8iwi!isl"). At step S535, the intermediary computer 130 generates a match flag for each anonymized identifier. The match flag may be positive or negative. A positive match flag associated with the anonymized identifier may indicate that the anonymized identifier corresponds to a real identifier stored by or associated with the behavior analysis computer 140, such as a processing network. The behavior analysis computer 140 may have issued real identifiers having associated positive match flags. For example, when the behavior analysis computer 140 is a payment processing network, a positive match flag may indicate that that payment processing network issued the PAN (e.g., real identifier) associated with that user. A negative match flag associated with the anonymized identifier may indicate that the anonymized identifier does not correspond to a real identifier stored by or associated with the behavior analysis computer 140, e.g., the behavior analysis computer 140 did not issue real identifiers having associated negative match flags. In some embodiments, false positive match flags may be generated and associated with real identifiers. For example, a positive match flag may be associated with a real identifier that was not, in fact, issued by the behavior analysis computer 140. Such false positive match flags may protect the privacy of users 110 having a relationship with the behavior analysis computer 140. For example, by including false positive match flags, the requesting computer 120 may not definitively know whether or not a particular user has a PAN issued by the payment processing network.

At step S540, the intermediary computer 130 may transmit the real identifiers and the anonymized identifiers having a positive match flag to the behavior analysis computer 140. In some embodiments, the intermediary computer 130 may transmit only those real identifiers and anonymized identifiers having true positive match flags, i.e., the intermediary computer 130 may not transmit the real identifiers having false positive match flags, such that the real identifiers of users 110 that are not associated or enrolled with the behavior analysis computer 140 are not disclosed to the behavior analysis computer 140. This may protect the privacy of the users 110 that do not have established relationships with the behavior analysis computer 140.

At step S545, the intermediary computer 130 may transmit the PIIs, anonymized identifiers, and match flags (both positive and negative) to the requesting computer 120. At step S550, the requesting computer 120 may extract the PIIs and associated anonymized identifiers having positive match flags. At step S555, the requesting computer 120 may divide the anonymized identifiers into one or more cohorts based on criteria (e.g., demographic or behavioral attributes) common to each particular cohort. Each cohort may be assigned a cohort identifier that uniquely identifies each cohort and enables the requesting computer 120 to later determine a subset of anonymized identifiers (associated with users 110) belonging to each cohort. For example, the requesting computer 120 may select a cohort of 20-29 year old individuals for which to request spending behavior in order to determine how a 20-29 year old may react to certain products advertised for sale.

At step S560, the requesting computer 120 transmits the cohort identifier and the subset of the anonymized identifiers to the behavior analysis computer 140. At step S565, the behavior analysis computer 140 retrieves a subset of the real identifiers that is associated with the subset of the anonymized identifiers. At step S570, the behavior analysis computer 140 calculates one or more metrics for each of the real identifiers of the subset based on behavioral data stored by the behavior analysis computer 140. For example, when the behavior analysis computer 140 is a payment processing network, the payment processing network may calculate an indexed buy rate associated with a PAN as an index of the national buying rate.

At step S575, the behavior analysis computer 140 aggregates the metrics for each of the real identifiers of the subset to determine one or more aggregated metrics for the subset of the anonymized identifiers. Thus, the behaviors of individual users 110 associated with the subset of the anonymized identifiers are aggregated such that individual behaviors or actions may not be identified and associated with a particular user 110. For example, when the behavior analysis computer 140 is a payment processing network, the payment processing network may calculate an indexed buy rate associated with the cohort as an index of the national buying rate. At step S580, the behavior analysis computer 140 transmits the cohort identifier and the one or more aggregated metrics to the requesting computer 120. The requesting computer 120 may then analyze the aggregated metrics and, in some embodiments, take actions based on the aggregated metrics. For example, if the requesting computer 120 is a cable company, the cable company may provide certain advertisements to certain subscribers.

Thus, in some embodiments, the intermediary computer 130 is a middleman between the requesting computer 120 and the behavior analysis computer 140 for communications therebetween. However, in some embodiments, it is contemplated that the intermediary computer 130 may alternatively or additionally facilitate the establishment of direct communication between the requesting computer 120 and the behavior analysis computer 140. For example, the intermediary computer 130 may provide the anonymized identifiers to the requesting computer 120 and the behavior analysis computer 140, then allow the requesting computer 120 and the behavior analysis computer 140 to communicate with each other directly using the anonymized identifiers.

Figure 6:
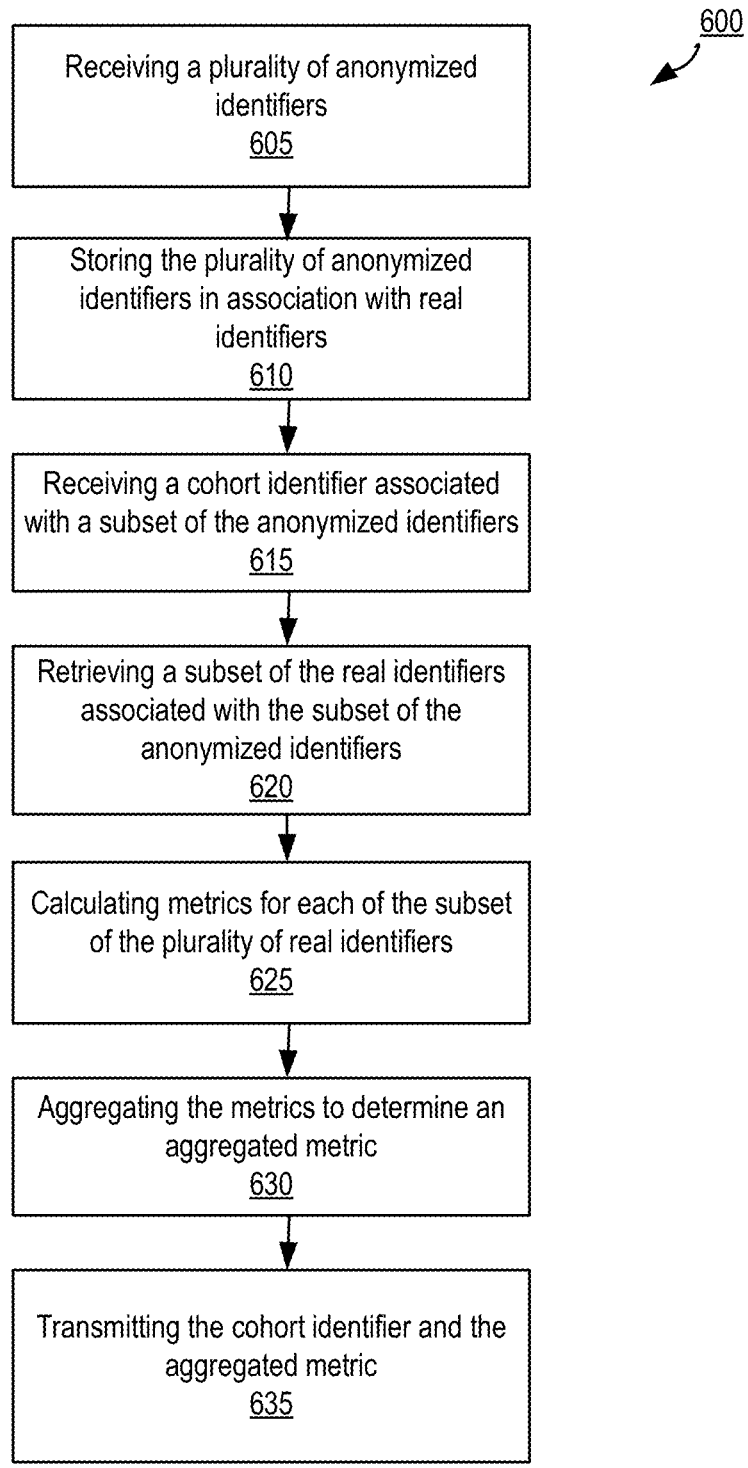
FIG. 6 shows another flow diagram of a method for anonymized behavior analysis, according to an embodiment of the present invention.

FIG. 6 shows another flow diagram 600 of a method for anonymized behavior analysis, according to some embodiments of the present invention. At process block 605, a plurality of anonymized identifiers may be received by a server computer. The server may be, for example, a behavior analysis computer as described herein. Each of the plurality of anonymized identifiers may be associated with a real identifier of a plurality of stored real identifiers.

The plurality of anonymized identifiers may include a plurality of matched identifiers. Each matched identifier of the plurality of matched identifiers may have been generated by an intermediary computer in response to a match between PII received from a requesting computer and a real identifier of the plurality of real identifiers stored by the server computer. In some embodiments, the plurality of anonymized identifiers may include a plurality of unmatched identifiers. Each unmatched identifier may have been generated by the intermediary computer in response to no match being found between the PII and the real identifier. Each of the plurality of matched identifiers and at least one of the plurality of unmatched identifiers may include a positive match flag. In other words, some unmatched identifiers may nevertheless be associated with a positive match flag, in order to protect the privacy of users having real identifiers. In some embodiments, the server computer may receive a number of the plurality of matched identifiers, such that the server computer may determine how many matched identifiers are included in the plurality of anonymized identifiers.

At process block 610, the plurality of anonymized identifiers may be stored in association with the plurality of real identifiers. At process block 615, the server computer may receive a cohort identifier from the requesting computer. The cohort identifier may be associated with a subset of the plurality of anonymized identifiers. The cohort identifier may characterize the subset of the plurality of anonymized identifiers based on one or more criteria. The one or more criteria may include one or more demographic and/or one or more behavioral attribute. The one or more demographic may include at least one of gender, income level, or location (e.g., location of citizenship, location of residence, location of employment, location of study, etc.).

At process block 620, the server computer may retrieve a subset of the plurality of real identifiers associated with the subset of the plurality of anonymized identifiers. At process block 625, the server computer may calculate at least one metric for the subset of the plurality of real identifiers. In some embodiments, the at least one metric may be a quantitative measurement of behavior, such as behavioral statistics. In some embodiments, the at least one metric may correspond to a category. The category may include at least one of entertainment, travel or dining. In some embodiments, the at least one metric may be calculated over a time period. For example, the metric may be a user's average amount of money spent eating out in a week. In another example, the metric may be a user's total amount of time spent on a plane in a year. In still another example, the metric may be a user's most frequently viewed genre of movies over a lifetime.

At process block 630, the server computer may aggregate the at least one metric for the subset of the plurality of real identifiers to determine at least one aggregated metric for the subset of the plurality of anonymized identifiers. At process block 630, the server computer may transmit the cohort identifier and the at least one aggregated metric to the requesting computer. In some embodiments, by using anonymized identifiers, the requesting computer does not need to access the real identifiers, and the server computer does not need to access the PIIs. Thus, privacy of the users is protected.

III. Applications

Embodiments of the invention may be used to calculate a variety of behavioral metrics for users. One example of a behavior for which metrics may be calculated according to embodiments of the invention is a spending behavior. A spending behavior may include how, when, where, and/or on what users spend money.

Figure 7:
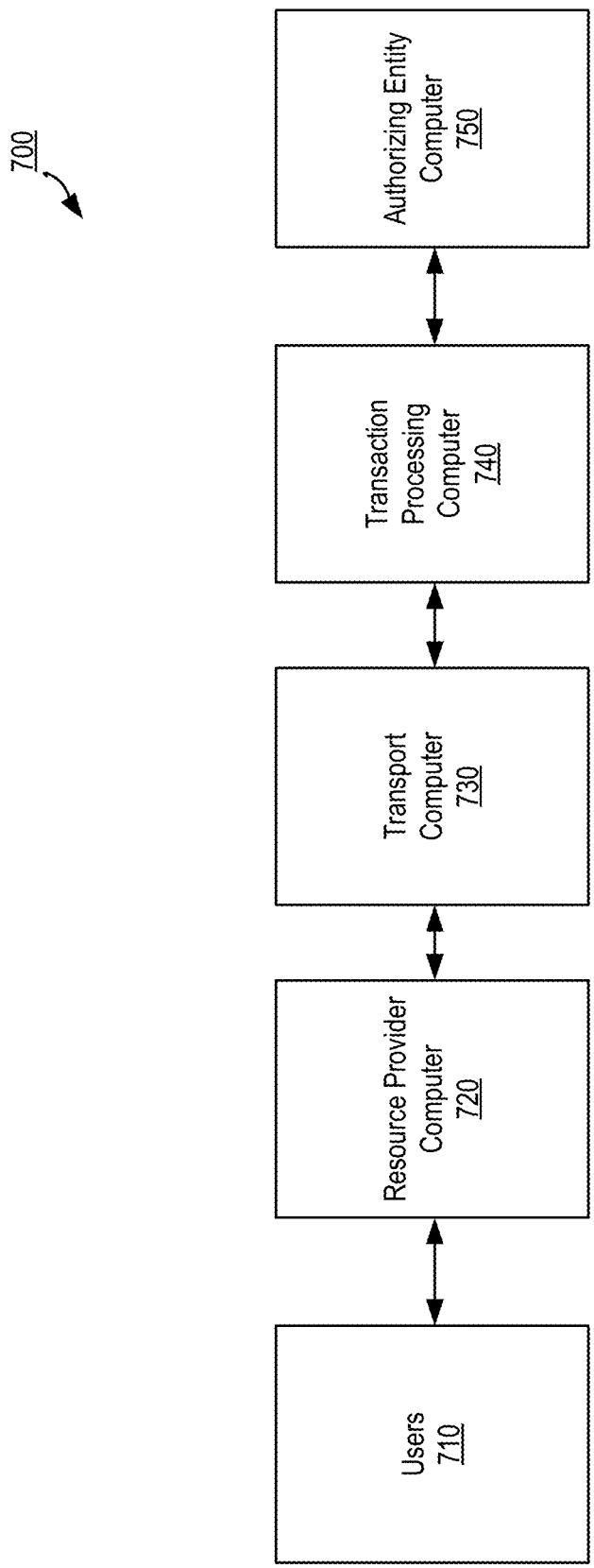
FIG. 7 shows a block diagram of a transaction processing system, according to an embodiment of the present invention.

FIG. 7 shows a block diagram of a transaction processing system 700 that may be used to collect data regarding users' spending behaviors according to an embodiment of the present invention. The system 700 may include users 710, a resource provider computer 720, a transport computer 730, a transaction processing computer 740, and an authorizing entity computer 750. In some embodiments, each of the users 710, the resource provider computer 720, the transport computer 730, the transaction processing computer 740, and the authorizing entity computer 750 may be in operative communication with each other. The components in FIG. 7 may communicate via any suitable communication medium (including the Internet), using any suitable communications protocol. For simplicity of illustration, a certain number of components are shown in FIG. 7. It is understood, however, that embodiments of the invention may include more than one of each component. In addition, some embodiments of the invention may include fewer than or greater than all of the components shown in FIG. 7. In addition, Users 710 may use a portable consumer device to initiate a transaction with the resource provider computer 720. A portable consumer device may include any payment device suitable to carry out a financial transaction or any other additional related actions that is portable, such as a credit card, debit card, or prepaid card. In other embodiments, the portable device could have other forms including wearables (smart watches), vehicles (cars), and portable communication devices such as mobile phones. In some cases, the portable consumer device may be separate from the communication device. In some embodiments, the portable consumer device may include a processor and a memory and may store credentials that may be used to initiate and complete transactions. For example, in the case of a portable communication device, the portable communication device may store a mobile wallet application or payment application. The application may be provisioned with account information to enable the portable communication device to conduct transactions. The portable communication device may also include a secure element that can be implemented in either hardware and/or software, which may store sensitive account or personal information.

The resource provider computer 720 may be operated by or associated with a resource provider, and may be configured to receive transaction data from an access device (not shown). Resource provider computer 720 may enable a resource provider such as a merchant to engage in transactions, sell goods or services, or provide access to goods or services to users 720. The resource provider computer 720 may accept multiple forms of payment and may use multiple tools to conduct different types of transactions. For example, the resource provider computer 720 may communicate with, include, or be an access device at a physical store operated by the merchant for in-person transactions. The resource provider computer 720 may also enable the merchant to sell goods and/or services via a website, and may accept payments over the Internet. The resource provider computer 720 may comprise a server computer. The server computer may include a processor and a computer readable medium coupled to the processor, the computer readable medium comprising code, executable by the processor. In some embodiments, the resource provider computer 720 may be a requesting computer, such as requesting computer 120 of FIG. 1 and/or requesting computer 200 of FIG. 2.

The transport computer 730 may be a system for an entity (e.g., a bank) that has a business relationship with a particular resource provider (e.g., merchant) or other entity. In some embodiments, the transport computer 730 may be associated with an acquirer bank. The transport computer 730 may route an authorization request for a transaction to an appropriate transaction processing computer 740 (e.g., the transaction processor associated with the portable consumer device used to initiate the transaction). The transport computer 730 may comprise a server computer. The server computer may include a processor and a computer readable medium coupled to the processor, the computer readable medium comprising code, executable by the processor.

The transaction processing computer 740 may be associated with one or more payment service providers. The transaction processing computer 740 may be configured to receive authorization request messages from a transport computer 730 and route them to the appropriate authorizing entity computer 750 (e.g., the issuer of the portable consumer device used to initiate the transaction). The transaction processing computer 740 may further be configured to receive authorization response messages from the authorizing entity computer 750 and route them to the appropriate transport computer 730 (e.g., the acquirer that sent the corresponding authorization request message). The transaction processing computer 740 may comprise a server computer. The server computer may include a processor and a computer readable medium coupled to the processor, the computer readable medium comprising code, executable by the processor. In some embodiments, the transaction processing computer 740 may be a behavior analysis computer, such as behavior analysis computer 140 of FIG. 1 and/or behavior analysis computer 400 of FIG. 4.

The authorizing entity computer 750 is typically run by a business entity (e.g., a bank) that may have issued a payment (credit/debit) card, account numbers or payment tokens used for the transactions. Some systems can perform both authorizing entity computer 750 and transport computer 730 functions. When a transaction involves a payment account associated with the authorizing entity computer 750, the authorizing entity computer 750 may verify the account and respond with an authorization response message to the transport computer 730 that may be forwarded to the corresponding resource provider computer 720 and/or users 710, if applicable. The authorizing entity computer 160 may comprise a server computer. The server computer may include a processor and a computer readable medium coupled to the processor, the computer readable medium comprising code, executable by the processor. In some embodiments, the authorizing entity computer 750 may be a behavior analysis computer, such as behavior analysis computer 140 of FIG. 1 and/or behavior analysis computer 400 of FIG. 4, as the authorizing entity computer 750 may have access to transaction records associated with PANs issued by it.

At a later time after the transaction is completed (e.g., at the end of the day), a clearing and settlement process can occur between the transport computer 730, the transaction processing computer 740, and the authorizing entity computer 750.

The transaction processing computer 740 and/or the authorizing entity computer 750 may be a behavior analysis computer as described herein, as both entities may have access to the transaction records needed to calculate spending behavior metrics. For example, the transaction processing computer 740 may process all transactions initiated with a portable consumer device associated with the transaction processing computer 740. The authorizing entity computer 750 may authorize all transactions initiated with a portable consumer device issued by the authorizing entity computer 750.

Thus, the transaction processing computer 740 and/or the authorizing entity computer 750 may store records of transactions for each portable consumer device that can be used to calculate metrics of spending behavior. For example, the transaction processing computer 740 and/or the authorizing entity computer 750 may store authorization request messages and authorization response messages in association with a PAN used to initiate those transactions. The authorization request messages and/or authorization response messages may include information that may be used to calculate spending behavior metrics, such as date of transaction, time of transaction, type of transaction (e.g., purchase, reversal, chargeback, etc.), amount of transaction, category of resource provider (e.g., grocery store, restaurant, clothing store, etc.), combinations thereof, and the like.

It is contemplated that embodiments of the invention may be used to calculate metrics regarding a variety of other behaviors as well. Other exemplary behaviors for which metrics may be calculated include action and habitual behaviors (e.g., what, how often, when, and for how long a user does something, such as visits a particular location or performs a particular function), observing behaviors (e.g., how, how often, when, where and for how long a user watches something and what a user watches), social behavior (e.g., how, how often, when, where, about what and for how long a user interacts or communicates with another user, who the user interacts with, and how many other users the user interacts with), combinations thereof, and the like.

IV. Example Computer Systems

The various participants and elements described herein may operate one or more computer apparatuses to facilitate the functions described herein. Any of the elements in the above-described figures, including any servers or databases, may use any suitable number of subsystems to facilitate the functions described herein.

Such subsystems or components are interconnected via a system bus. Subsystems may include a printer, keyboard, fixed disk (or other memory comprising computer readable media), monitor, which is coupled to display adapter, and others. Peripherals and input/output (I/O) devices, which couple to an I/O controller (which can be a processor or other suitable controller), can be connected to the computer system by any number of means known in the art. For example, an external interface can be used to connect the computer apparatus to a wide area network such as the Internet, a mouse input device, or a scanner. The interconnection via the system bus allows the central processor to communicate with each subsystem and to control the execution of instructions from system memory or the fixed disk, as well as the exchange of information between subsystems. The system memory and/or the fixed disk may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a server computer, a plurality of anonymized identifiers, a first portion of the plurality of anonymized identifiers being associated with a real identifier of a plurality of real identifiers and a second portion of the plurality of anonymized identifiers not being associated with the real identifier of the plurality of real identifiers, stored by the server computer, wherein the first portion of the plurality of anonymized identifiers includes a plurality of matched identifiers, a matched identifier of the plurality of matched identifiers associated with a match between personally identifiable information received from a requesting computer and the real identifier of the plurality of real identifiers stored by the server computer, and wherein the second portion of the plurality of anonymized identifiers are generated by an intermediary computer in response to a determination of a false positive match flag that corresponds to no match between the personally identifiable information received from the requesting computer and the plurality of real identifiers;
receiving, by the server computer from the requesting computer, a cohort identifier associated with a subset of the plurality of anonymized identifiers, wherein the cohort identifier characterizes the subset of the plurality of anonymized identifiers based on one or more criteria;
retrieving, by the server computer, a subset of the plurality of real identifiers associated with the subset of the plurality of anonymized identifiers;
calculating, by the server computer, at least one metric for the subset of the plurality of real identifiers in response to receiving the cohort identifier, the at least one metric utilized to determine one aggregated metric for the subset of the plurality of real identifiers; and
transmitting, by the server computer, the cohort identifier and the one aggregated metric to the requesting computer.

2. The method of claim 1, wherein the plurality of anonymized identifiers includes at least one unmatched identifier, wherein each unmatched identifier of the at least one unmatched identifier was generated by the intermediary computer in response to no match being found between the personally identifiable information and the real identifier.

3. The method of claim 1, wherein receiving the plurality of anonymized identifiers includes receiving a number of the plurality of matched identifiers.

4. The method of claim 1, wherein the requesting computer is a resource provider that provides resources to one or more users associated with the personally identifiable information.

5. The method of claim 1, wherein the one or more criteria includes one or more demographic.

6. The method of claim 5, wherein the one or more demographic includes at least one of gender, income level, or location.

7. The method of claim 1, wherein the at least one metric corresponds to at least one category.

8. The method of claim 7, wherein the at least one category includes at least one of entertainment, travel, or dining.

9. The method of claim 1, wherein the at least one metric is calculated over a time period.

10. The method of claim 1, wherein the requesting computer does not have access to the plurality of real identifiers.

11. A server computer comprising:
a processor; and
a memory coupled to the processor, the memory storing instructions, which when executed by the processor, cause the server computer to perform operations including:

receiving a plurality of anonymized identifiers, a first portion of the plurality of anonymized identifiers being associated with a real identifier of a plurality of real identifiers and a second portion of the plurality of anonymized identifiers not being associated with the real identifier of the plurality of real identifiers, wherein the first portion of the plurality of anonymized identifiers includes a plurality of matched identifiers, a matched identifier of the plurality of matched identifiers associated with a match between personally identifiable information received from a requesting computer and the real identifier of the plurality of real identifiers, and wherein the second portion of the plurality of anonymized identifiers are generated by an intermediary computer in response to a determination of a false positive match flag that corresponds to no match between the personally identifiable information received from the requesting computer and the plurality of real identifiers;

receiving, from the requesting computer, a cohort identifier associated with a subset of the plurality of anonymized identifiers, wherein the cohort identifier characterizes the subset of the plurality of anonymized identifiers based on one or more criteria;

retrieving a subset of the plurality of real identifiers associated with the subset of the plurality of anonymized identifiers;

calculating at least one metric for a subset of the plurality of real identifiers in response to receiving the cohort identifier, the at least one metric utilized to determine one aggregated metric for the subset of the plurality of real identifiers; and transmitting the cohort identifier and the one aggregated metric to the requesting computer.

12. The server computer of claim 11, wherein the plurality of anonymized identifiers includes at least one unmatched identifier, wherein each unmatched identifier of the at least one unmatched identifier was generated by the intermediary computer in response to no match being found between the personally identifiable information and the real identifier.

13. The server computer of claim 11, wherein receiving the plurality of anonymized identifiers includes receiving a number of the plurality of matched identifiers.

14. The server computer of claim 11, wherein the one or more criteria includes one or more demographic.

15. The server computer of claim 14, wherein the one or more demographic includes at least one of gender, income level, or location.

16. The server computer of claim 11, wherein an anonymized identifier of the plurality of anonymized identifiers comprises a random set of characters.

17. The server computer of claim 11, wherein the at least one metric corresponds to at least one category.

18. The server computer of claim 17, wherein the at least one category includes at least one of entertainment, travel, or dining.

19. The server computer of claim 11, wherein the at least one metric is calculated over a time period.

20. The server computer of claim 11, wherein the requesting computer does not have access to the plurality of real identifiers.

* * * * *